(12) United States Patent
Choi et al.

(10) Patent No.: US 6,535,265 B2
(45) Date of Patent: Mar. 18, 2003

(54) LIQUID CRYSTAL DISPLAY PANEL HAVING WIDE VIEWING ANGLE AND METHOD OF FABRICATING THE SAME

(75) Inventors: Yu Jin Choi, Kyunggi-do (KR); Hyung Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 246 days.

(21) Appl. No.: 09/769,764

(22) Filed: Jan. 26, 2001

(65) Prior Publication Data

US 2001/0026339 A1 Oct. 4, 2001

(30) Foreign Application Priority Data

Feb. 3, 2000 (KR) .......................................... P00-5452

(51) Int. Cl.7 .......................................... G02F 1/1333
(52) U.S. Cl. ....................................................... 349/156
(58) Field of Search .......................................... 349/156

(56) References Cited

U.S. PATENT DOCUMENTS

| 5,673,092 | A | | 9/1997 | Horie et al. | |
| 6,236,445 | B1 | * | 5/2001 | Foschaar et al. | 349/156 |
| 6,339,462 | B1 | * | 1/2002 | Kishimoto et al. | 349/156 |
| 6,441,881 | B1 | * | 8/2002 | Enomoto et al. | 349/156 |

* cited by examiner

Primary Examiner—James Dudek
(74) Attorney, Agent, or Firm—Morgan, Lewis & Bockius LLP

(57) ABSTRACT

The present invention discloses a liquid crystal display panel and a method of fabricating the same. More specifically, the liquid crystal display panel of the present invention includes first and second substrates, a first alignment layer on the first substrate, a second alignment layer on the second substrate, at least a pair of barrier ribs between the first and second alignment layers, wherein the barrier ribs are formed to have first and second angles with respect to the plane substantially perpendicular to the first and second substrates, and a liquid crystal layer between the first and second substrates.

25 Claims, 7 Drawing Sheets

LIQUID CRYSTAL DISPLAY PANEL HAVING WIDE VIEWING ANGLE AND METHOD OF FABRICATING THE SAME

This application claims the benefit of Korean Application No. P00-5452 filed Feb. 3, 2000, which is hereby incorporated by reference.

BACKGROUND OF THE INVENTION

1. Field of the Invention

This invention relates to a liquid crystal display, and more particularly to a liquid crystal display panel and a method of fabricating the same. Although the present invention is suitable for a wide scope of applications, it is particularly suitable for easily controlling an alignment direction of liquid crystals as well as improving a viewing angle.

2. Description of the Related Art

Generally, an active matrix liquid crystal display (LCD) uses a thin film transistor (TFT) as a switching device to display a moving picture. The LCD can be manufactured smaller than a Brown tube. Thus, it has been widely used in various applications, such as a personal computer, a notebook computer, office automation equipment, and a portable electronic equipment, etc.

FIG. 1 is a perspective view showing a structure of the conventional liquid crystal display panel, and FIG. 2 is a cross-sectional view of the panel taken in the II–II' line direction in FIG. 1.

Initially referring to FIGS. 1 and 2, the conventional LCD panel includes upper and lower substrates 2 and 4 assembled to each other with a sealant, barrier ribs 8 for separating each liquid crystal cell 16, resin black matrices 10 formed on the lower substrate 4 if necessary, a pixel electrode 14 positioned on the lower substrate 4 at the center of the liquid crystal cell 16, a protrusion 12 positioned at the center of the pixel electrode 14, and a common electrode 6 formed on the upper substrate 2. A mixture of a liquid crystal and a photosensitive polymer is injected between the upper and lower substrates 2 and 4. A mask having a certain pattern is put on the upper substrate 2 where the mixture has been injected, and an ultraviolet (UV) ray is vertically irradiated thereon. At this time, the mixture at the portion exposed to the UV causes a phase separation between the liquid crystal and the polymer. When the phase separation occurs between the liquid crystal and the polymer, the polymer serves as the barrier ribs 8 to align liquid crystal molecules.

FIG. 3 is a plan view of the panel taken in the III–III' line direction in FIG. 1. As shown in FIG. 3, liquid crystal molecules of the liquid crystal cell 16 have four sides and each side has the same size. The liquid crystal cell 16 is surrounded by the barrier ribs 8, which have a symmetrical alignment in all directions. When a voltage is applied to the common electrode 6 and the pixel electrode 14, the liquid crystal molecules aligned in this manner move into a symmetrical direction on all sides by electric fields. As a result, a viewing angle is improved. The protrusion 12 positioned on the pixel electrode 14 prevents an alignment disorder of the liquid crystal molecules that may be generated upon application of a data voltage. In other words, when a vertical alignment film is formed on the upper and lower substrates 2 and 4, the liquid crystal molecules having a negative dielectric anisotropy are vertically aligned. However, when a voltage is applied to the pixel electrode 14, the liquid crystal molecules aligned vertically at the center of the liquid crystal cell 16 may lose their balance. Thus, they may be laid down. In order to set up the laid-down liquid crystal molecules, the protrusion 12 serving as a center point is provided on the pixel electrode 14. The black matrices 10 are provided on the lower substrate 4 to align the liquid crystal molecules as well as to shield light.

However, the liquid crystal display panel having a structure as mentioned above has some drawbacks. For example, it is difficult to control an alignment direction of the liquid crystal molecules only with the polymer included in the barrier rib. Also, an ultraviolet ray should be irradiated on the liquid crystal display while applying a voltage to the display and heating the display at a high temperature in its fabrication process.

SUMMARY OF THE INVENTION

Accordingly, the present invention is directed to a liquid crystal display panel having a wide viewing angle and a method of fabricating the same that substantially obviate one or more of problems due to limitations and disadvantages of the related art.

Another object of the invention is to provide a liquid crystal display panel and a method of fabricating the same that easily control alignment directions of the liquid crystals as well as improve a viewing angle.

Additional features and advantages of the invention will be set forth in the description, which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodided and broadly described, a liquid crystal display panel includes first and second substrates, a first alignment layer on the first substrate, a second alignment layer on the second substrate, at least a pair of barrier ribs between the first and second alignment layers, wherein the barrier ribs are formed to have first and second angles with respect to the plane substantially perpendicular to the first and second substrates, and a liquid crystal layer between the first and second substrates.

In another aspect of the present invention, a method of fabricating a liquid crystal display panel having first and second substrates includes forming a first alignment layer on the first substrate, forming a second alignment layer on the second substrate, forming a liquid crystal layer between the first and second substrates, and forming at least one barrier rib between the first and second alignment layers, wherein the barrier ribs are formed to have first and second angles with respect to the plane substantially perpendicular to the first and second substrates.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
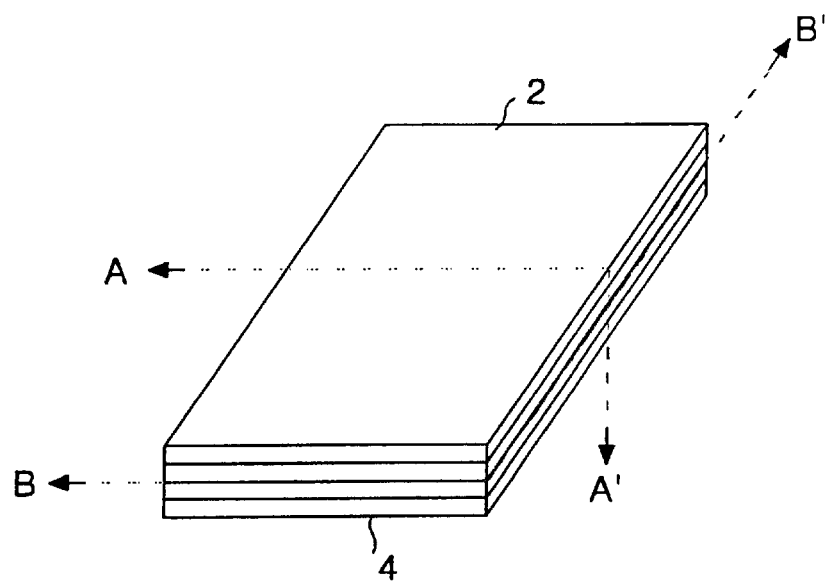
FIG. 1 is a perspective view showing a LCD panel structure of the conventional liquid crystal display.
Figure 2:
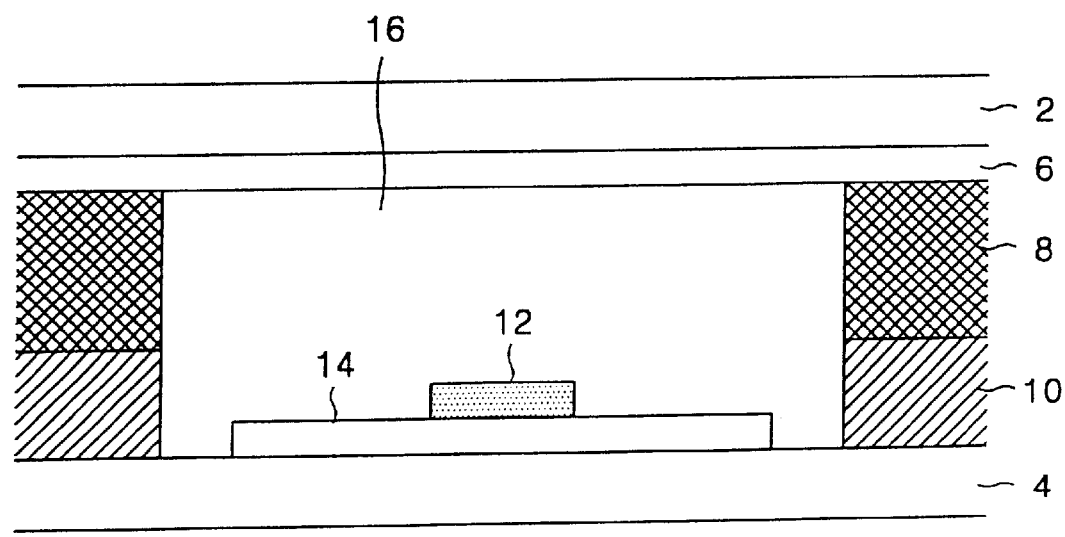
FIG. 2 is a cross-sectional view of the panel along with the line II–II' shown in FIG. 1.
Figure 3:
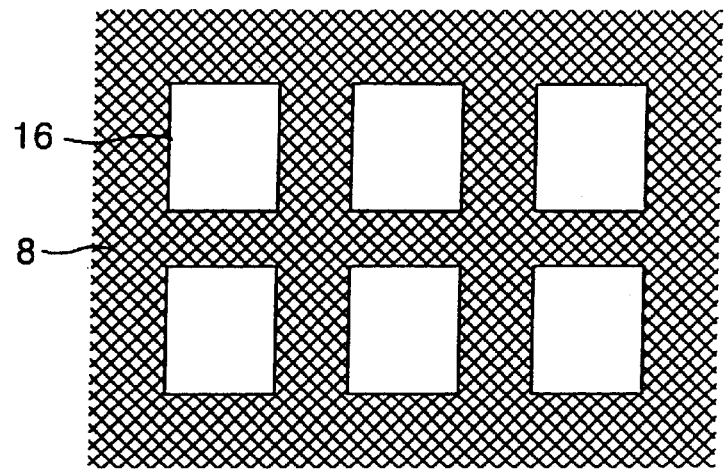
FIG. 3 is a plan view of the panel shown in FIG. 1.
Figure 4:
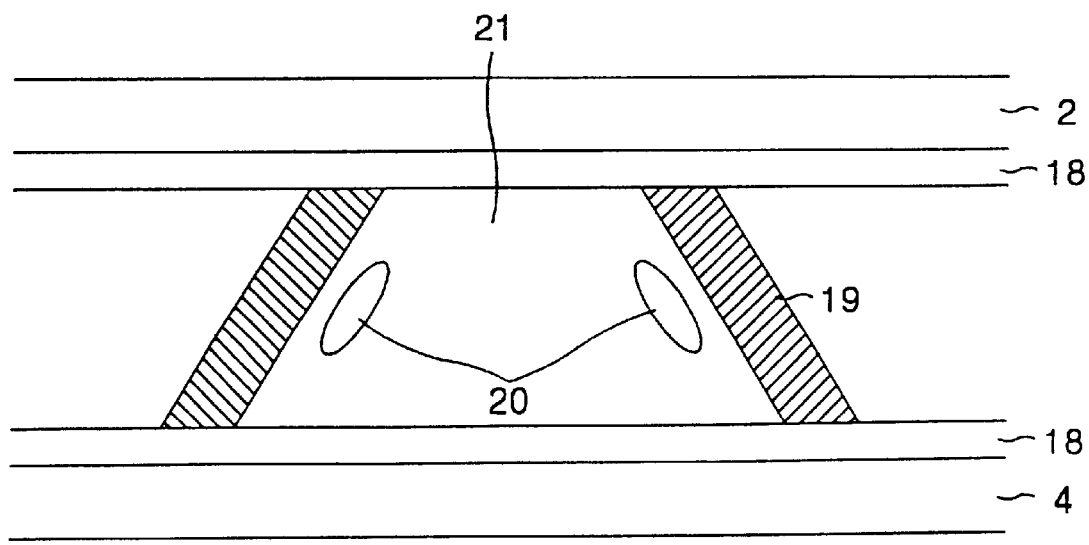
FIG. 4 is a cross-sectional view showing a panel structure of a liquid crystal display according to an embodiment of the present invention.

FIG. 4 illustrates a structure of a liquid crystal display panel according to an embodiment of the present invention. As shown in FIG. 4, the LCD panel includes upper and lower substrates 2 and 4 adhered to each other with a sealant, an alignment film 18 formed on the upper and lower substrates 2 and 4, barrier ribs 19 formed between the alignment films 18 at least in two different directions. Further, liquid crystal molecules 20 formed between the upper and lower substrates 2 and 4 are vertically aligned when no voltage is applied. They are aligned with the inclined directions of the polymer barrier ribs 19 when a voltage is applied. A pair of the barrier ribs 19 having a symmetrical slope define each of liquid crystal cells 21 and align the liquid crystal molecules 20 with respect to the slope of the barrier rib when a voltage is applied to a common electrode and a pixel electrode. The aligned liquid crystal molecules improve a viewing angle. A negative dielectric anisotropy material is used as a liquid crystal while a vertical alignment film is used as an alignment film in this embodiment. Alternatively, a positive dielectric anisotropy material or a liquid crystal added with a chairal dopant may be used for the embodiment.

Figure 5A:
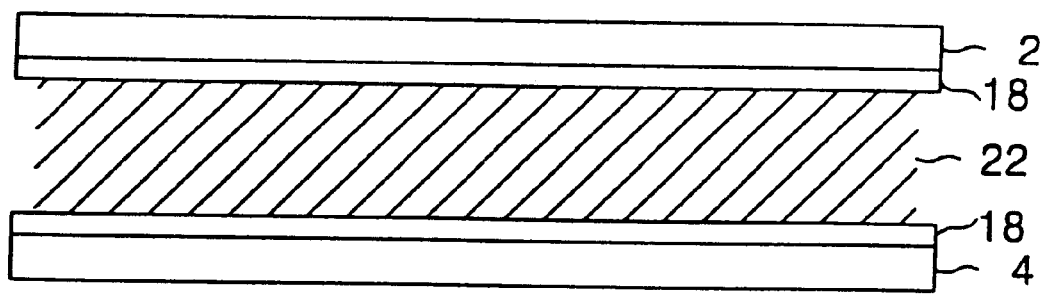
FIGS. 5A to 5C are cross-sectional views illustrating the process steps of fabricating method of barrier ribs in the panel shown in FIG. 4.
Figure 5B:
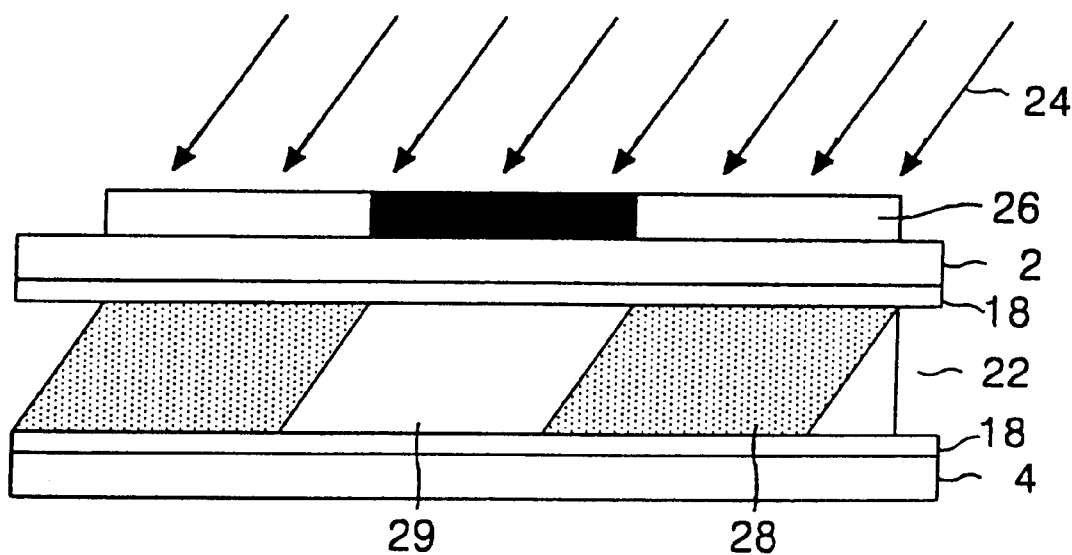
Figure 5C:
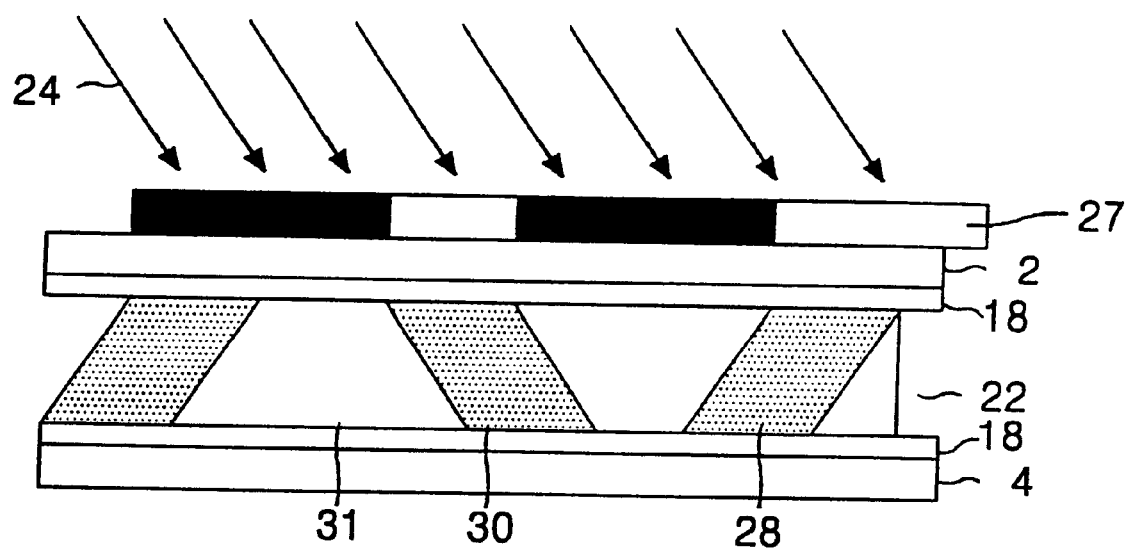

Next, a method of forming the barrier ribs 19 will be described as follows with reference to FIGS. 5A to 5C. Initially, as shown in FIG. 5A, a mixture of liquid crystals and a polymer is injected between the upper and lower substrates 2 and 4. The alignment film 18 is already formed thereon. As shown in FIG. 5B, an ultraviolet (UV) ray 24 is irradiated with an angle onto the upper substrate 2 where the mixture 22 has been injected through a mask 26 having a certain pattern formed on the upper substrate 2. At this time, the mixture 22 at the portion exposed to the ultraviolet ray 24 is cured, thereby forming a barrier rib 28 having a slope matching to the irradiation angle. The area below the screened portion of the mask 26 becomes a liquid crystal cell 29. In forming another barrier rib 30 having a slope different from that of the barrier rib 28, an ultraviolet ray 24 is irradiated with a different angle onto the upper substrate 2 with the mask 26 having a certain pattern on the upper substrate 2, as shown in FIG. 5C. In this case, an irradiation angle of the ultraviolet ray 24 is different from the irradiation angle shown in FIG. 5B. For example, the irradiation angle 24 in FIG. 5C is substantially symmetrical to the irradiation angle 24 in FIG. 5B with respect to the plane perpendicular to the substrates. By this method, a liquid crystal cell 35 is formed to be surrounded by the barrier ribs, as shown in FIGS. 6A and 6B.

Figure 6A:
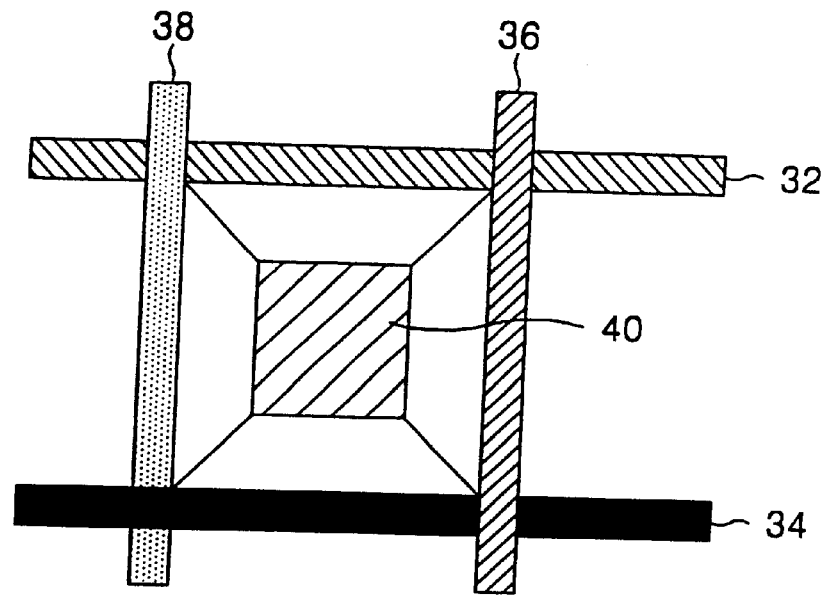
FIGS. 6A and 6B are plan views showing liquid crystal cells surrounded by barrier ribs in all directions.
Figure 6B:
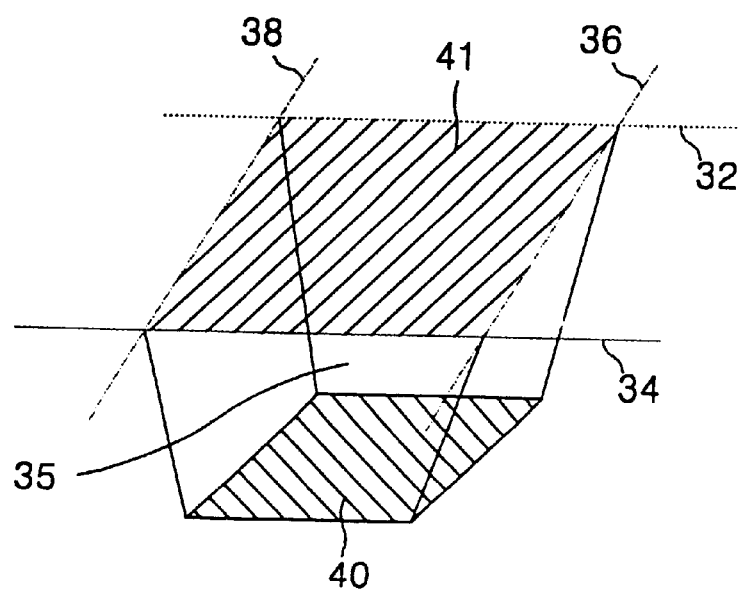

Referring to FIGS. 6A and 6B, barrier ribs having four sides are formed to have inclines, so that the bottom surface 40 of the liquid crystal portion has an area smaller than the top surface 41 thereof. A first barrier rib 32 and a second barrier rib 34 have different angles, so that the angles are symmetrical to each other. Likewise, a third barrier rib 36 and a fourth barrier rib 38 also have a different slope at the location opposed to each other. Thus, the liquid crystal cell 35 forms a hexahedron by the four barrier ribs 32, 34, 36 and 38.

Figure 7:
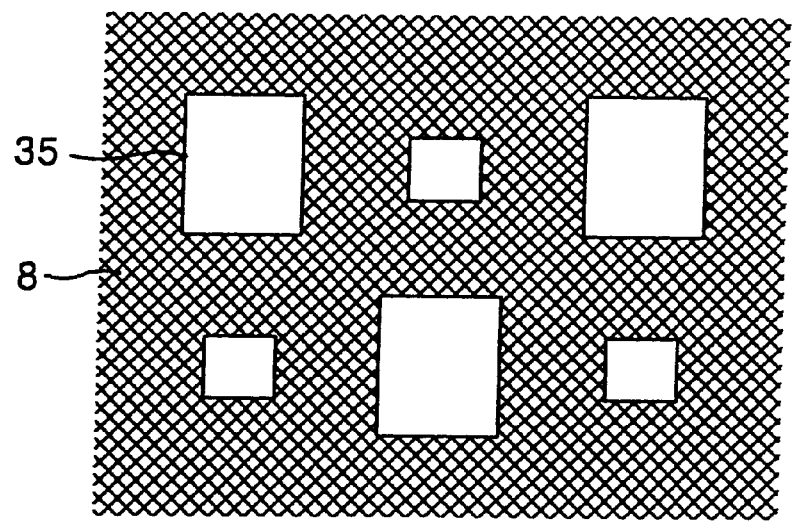
FIG. 7 is a plan view of the LCD panel including the liquid crystal cells shown in FIGS. 6A and 6B.

FIG. 7 is a plan view showing a structure of the LCD panel including the liquid crystal cells 35. There are three different shapes of the barrier ribs, such as a stripe shape barrier rib, a zigzag shape barrier rib, and a lozenge shape barrier rib. Depending upon a mask having a certain pattern and an irradiation direction of the ultraviolet ray, different shapes of the barrier ribs are obtained as described above.

Figure 8:
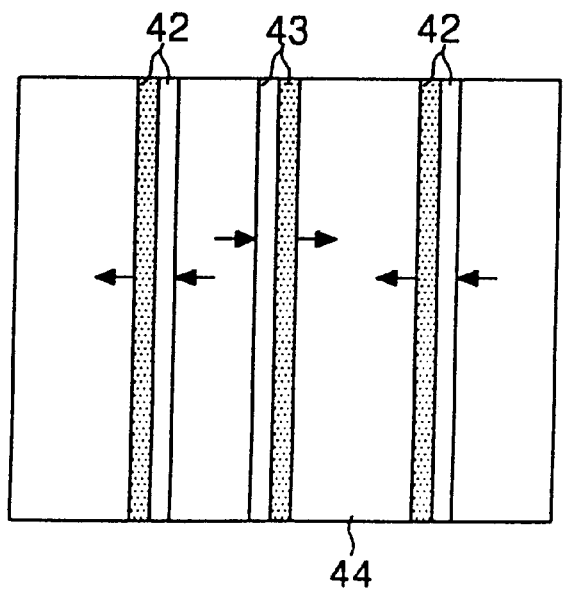
FIG. 8 is a cross-sectional view illustrating a linear shape of the barrier ribs according to a first embodiment of the present invention.

FIG. 8 shows a stripe shape barrier rib. As shown in FIG. 8, pairs of stripe shape barrier ribs 42 and 43 have one inclined direction in liquid crystals. They are sequentially formed in the panel to have angles symmetrical to each other. In order to form the stripe shape barrier ribs 42 and 43, a mask having a stripe pattern is formed sequentially on the upper substrate from a side portion where a mixture of a liquid crystal and a polymer has been injected. Thereafter, an ultraviolet ray is irradiated with an angle onto the upper substrate. The mixture exposed to the ultraviolet ray is cured, thereby forming the barrier rib 42 having the same angle as the irradiation angle of the ultraviolet ray. A portion below the screened portion of the mask becomes the liquid crystal cell 44. The barrier rib 43 having an angle different from that of the barrier rib 42 is formed simply by allowing the ultraviolet ray to have a different irradiation angle. However, in the structure of the stripe shape barrier rib, inclined angles of the liquid crystal are limited to only two directions. For the purpose of improving this limitation, a zigzag shape barrier rib structure is suggested in the present invention, as shown in FIG. 9.

Figure 9:
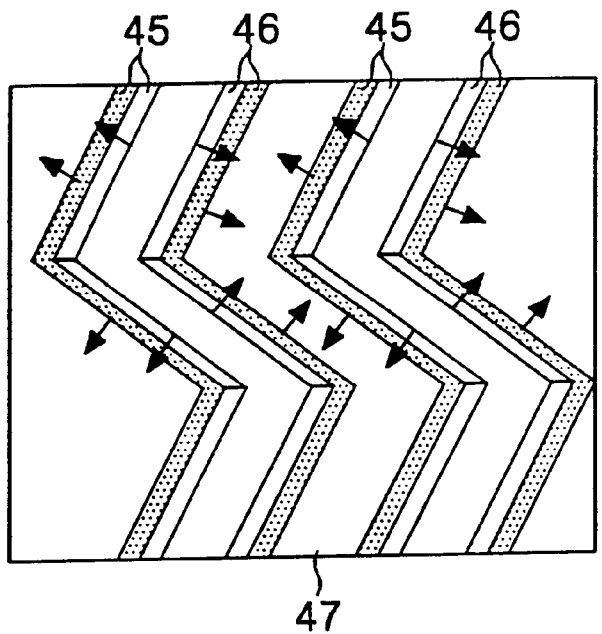
FIG. 9 is a cross-sectional view illustrating a zigzag shape of the barrier ribs according to a second embodiment of the present invention.

Referring to FIG. 9, zigzag shape barrier ribs 45 and 46 having two inclined directions of the liquid crystal are formed in parallel in the panel. Thus, shapes of the ribs are symmetrical. In forming the zigzag shape barrier ribs 45 and 46, a mask having a zigzag pattern is positioned sequentially on the upper substrate from a side portion where a mixture of a liquid crystal and a polymer has been injected. An ultraviolet ray is then irradiated with an angle onto the upper substrate. The mixture exposed to an ultraviolet ray is cured, thereby forming the barrier rib 45 having the same angle as the irradiation angle of the ultraviolet ray. In addition, the portion below the screened portion of the mask becomes a liquid crystal cell 47.

On the other hand, the barrier rib 46 having an angle different from the barrier rib 45 is formed simply by allowing the ultraviolet ray having a different irradiation angle. Utilization of the mask having a zigzag pattern has an advantage in that the barrier ribs are formed in two directions at the same time by only one irradiation of an ultraviolet ray to form inclines. Also, four inclined directions of the liquid crystal improve a viewing angle.

Figure 10:
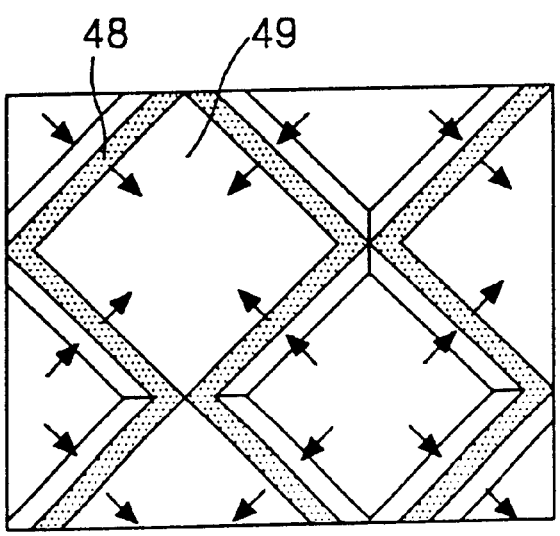
FIG. 10 is a cross-sectional view illustrating a zigzag shape of the barrier ribs according to a third embodiment of the present invention.

FIG. 10 shows a third embodiment of the zigzag shape barrier rib. In FIG. 10, each zigzag shape barrier rib forms a mutual symmetry, thereby forming lozenge shape barrier ribs 48. A mask in which the zigzag shape has a symmetrical pattern on the upper substrate of the panel is used so as to form the lozenge shape barrier ribs 48. A portion below the screened portion of the mask becomes a liquid crystal cell 49. Accordingly, the barrier ribs are formed in the LCD panel having at least two different directions, thereby easily controlling a different alignment direction of the liquid crystal as well as improving a viewing angle due to the barrier ribs.

As described above, the liquid crystal display panel according to the present invention are provided by deforming a shape of the barrier ribs, thereby easily controlling the alignment direction of the liquid crystal. Accordingly, it has an advantage in improving a viewing angle. Also, durability against an external physical impact is much enhanced by such barrier ribs.

It will be apparent to those skilled in the art that various modifications and variations can be made in the liquid crystal display panel and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display panel comprising:
   first and second substrates;
   a first alignment layer on the first substrate;
   a second alignment layer on the second substrate;
   at least a pair of barrier ribs between the first and second alignment layers, wherein the pair of the barrier ribs are formed to have first and second angles with respect to the plane substantially perpendicular to the first and second substrates; and
   a liquid crystal layer between the first and second substrates.

2. The liquid crystal display panel of claim 1, wherein the barrier ribs are formed to have a stripe pattern.

3. The liquid crystal display panel of claim 1, wherein the barrier ribs are formed to have a zigzag pattern.

4. The liquid crystal display panel of claim 1, wherein the barrier ribs are formed to have a lattice pattern.

5. The liquid crystal display panel of claim 1, wherein the first alignment layer is a vertical alignment layer.

6. The liquid crystal display panel of claim 1, wherein the second alignment layer is a vertical alignment layer.

7. The liquid crystal display panel of claim 1, wherein the liquid crystal layer has a negative dielectric anisotropy.

8. The liquid crystal display panel of claim 1, wherein the liquid crystal layer includes a polymer.

9. The liquid crystal display panel of claim 1, wherein an alignment direction of the liquid crystal layer substantially matches with first and second angles of the barrier ribs.

10. The liquid crystal display panel of claim 1, wherein the angles ($\Theta$) with respect to the plane is in the range of $0°<\Theta\leq90°$.

11. The liquid crystal display panel of claim 1, wherein the first and second angles are substantially symmetrical to each other.

12. A method of fabricating a liquid crystal display panel having first and second substrates, comprising:
    forming a first alignment layer on the first substrate;
    forming a second alignment layer on the second substrate;
    forming a liquid crystal layer between the first and second substrates; and
    forming at least a pair of barrier ribs between the first and second alignment layers, wherein the barrier ribs are formed to have first and second angles with respect to the plane substantially perpendicular to the first and second substrates.

13. The method of claim 12, further comprising the step of exposing a light onto the second the substrate in forming the barrier ribs.

14. The method of claim 12, wherein the light includes an ultraviolet ray.

15. The method of claim 12, wherein the angles of the barrier ribs are substantially the same as an irradiation angle of the light.

16. The method of claim 12, wherein the barrier ribs are formed as a stripe pattern.

17. The method of claim 12, wherein the barrier ribs are formed as a zigzag pattern.

18. The method of claim 12, wherein the barrier ribs are formed as a lattice pattern.

19. The method of claim 12, wherein the first alignment layer is a vertical alignment layer.

20. The method of claim 12, wherein the second alignment layer is a vertical alignment layer.

21. The method of claim 12, wherein the liquid crystal layer has a negative dielectric anisotropy.

22. The method of claim 12, wherein the liquid crystal layer includes a polymer.

23. The method of claim 12, wherein the angles of the barrier ribs are the same as an alignment direction of the liquid crystal layer.

24. The method of claim 12, wherein the angle ($\Theta$) with respect to the plane is in the range of $0°<\Theta\leq90°$.

25. The liquid crystal display panel of claim 12, wherein the first and second angles are substantially symmetrical to each other.

* * * * *